April 5, 1966  R. L. KARNS  3,244,816
SYSTEM FOR AUDIO TRAINING
Filed March 23, 1962  2 Sheets-Sheet 1
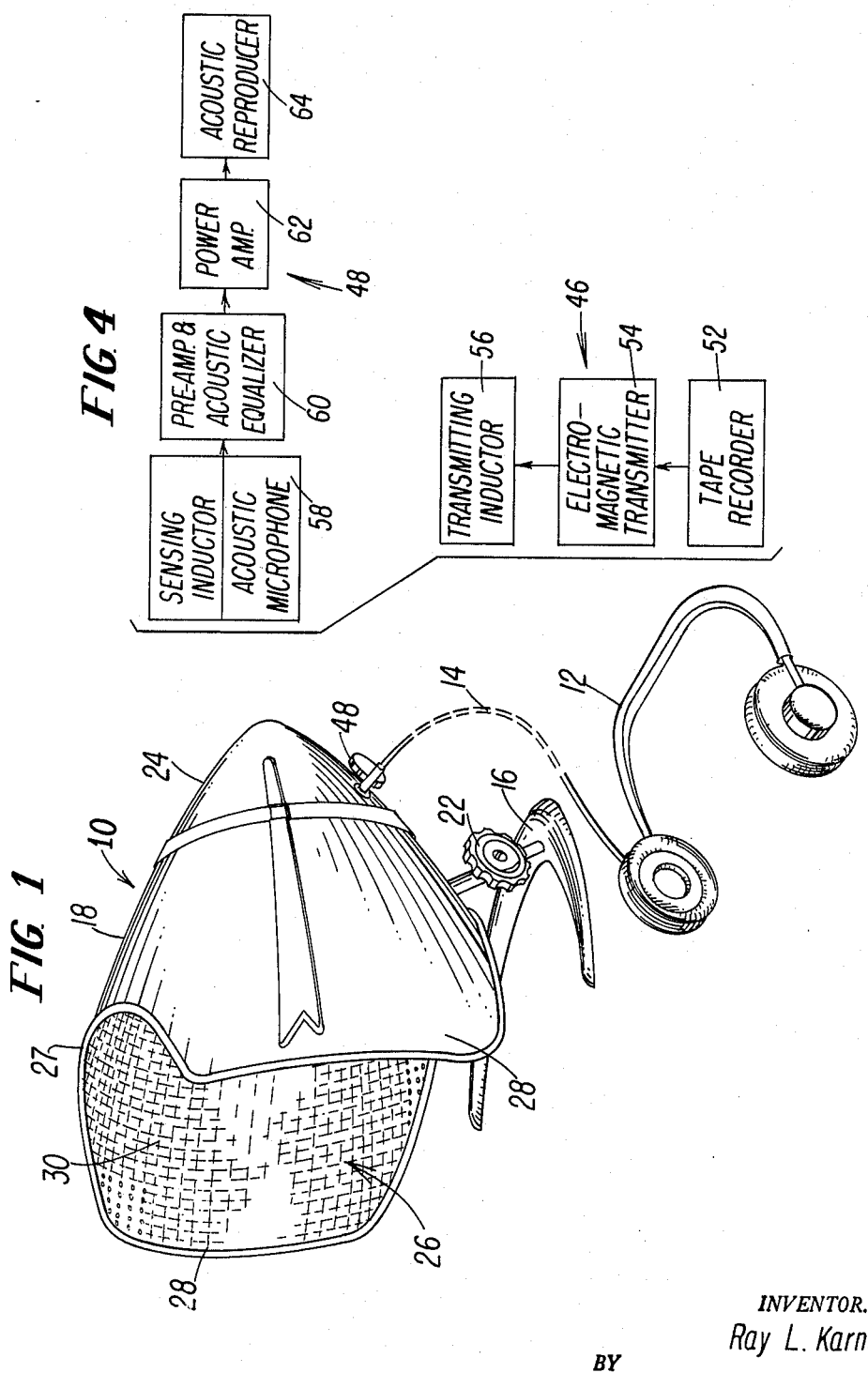
INVENTOR.
Ray L. Karns
BY
Byron, Hume, Groen + Clement
Attys.

April 5, 1966  R. L. KARNS  3,244,816
SYSTEM FOR AUDIO TRAINING
Filed March 23, 1962  2 Sheets-Sheet 2

INVENTOR.
Ray L. Karns
BY
Byron, Hume, Groen + Clement
Attys.

United States Patent Office 3,244,816
Patented Apr. 5, 1966

3,244,816
SYSTEM FOR AUDIO TRAINING
Ray L. Karns, Grand Rapids, Mich., assignor, by mesne assignments, to Bowmar Instrument Corporation, Fort Wayne, Ind., a corporation of Indiana
Filed Mar. 23, 1962, Ser. No. 181,943
5 Claims. (Cl. 179—82)

This invention relates to audio training and, more particularly, to a system for audio training and a portable acoustical isolation chamber for use therein.

In recent years audio training has become an integral part of educational methodology, particularly in teaching languages. Classrooms for audio training have been specially constructed or adapted for this method of teaching and have sound insulated booths for each student.

In most cases the booth is equipped with a microphone, pre-amplifier, power amplifier and a set of earphones. Each amplifier in the booth is connected by electrical wiring to a tape recorder. The teacher places a tape recording on the tape recorder and the student sits in the booth and listens to the tape recording through his set of earphones. Usually, these audio training classes are used specifically for pronunciation drills. The tape recording, through the amplifier and earphones, pronounces a word or phrase to the student. During the pause in the tape recording the student pronounces the word out loud into the microphone in the booth and his pronunciation is carried back to his ears through the pre-amplifier and the power amplifier to the earphones he is wearing. The sound insulated booths are required to effect audio and visual isolation of each student.

Though this system of audio training is extremely effective, particularly in pronunciation drills of foreign languages, the construction of the booth and the requisite wiring of each individual booth in such a classroom is extremely expensive. Furthermore a classroom having been adapted for such audio training is not suitable for use as an ordinary classroom.

It is therefore desirable to provide a system for audio training wherein an ordinary classroom with desks and seats may be employed without expensive adaptation, including the construction of booths and wiring of each booth to a tape recorder.

It is an object of the present invention to provide a new and inexpensive system for audio training which may be employed in an ordinary classroom.

It is a further object of the present invention to provide an acoustical isolation chamber for audio and visual isolation of the student during an audio training class.

It is a further object of the present invention to provide a new and improved system for audio training including a portable acoustical isolation chamber for audio and visual isolation of the student, which system is wireless and may be used in any ordinary classroom.

These and other objects are accomplished by this invention which employs a transmitting inductor arrangement and a sensing inductor arrangement whereby acoustical isolation chambers in the audio training class are not wired to the tape recorder. In effect, the audio training class becomes a restricted transmitting station and each acoustical isolation chamber within the classroom boundary becomes a receiving station for the student to listen through earphones. Furthermore, the acoustical isolation chamber of the present invention provides audio and visual isolation and is portable so that an ordinary classroom may be employed for audio training merely by wiring the room for inductive transmission and placing the acoustical isolation chamber on a desk. In this manner the acoustical isolation chamber may be easily removed from the classroom when the classroom is to be used for purposes other than audio training.

The invention, both as to its organization and method of operation, taken with further objects and advantages thereof, will best be understood by reference to the following description taken in connection with the accompanying drawings, in which:

FIGURE 1 is a perspective view of an acoustical isolation chamber embodying the features of the present invention;

FIGURE 4 is a schematic diagram of a system for audio training embodying the features of the present invention.

Figure 3:
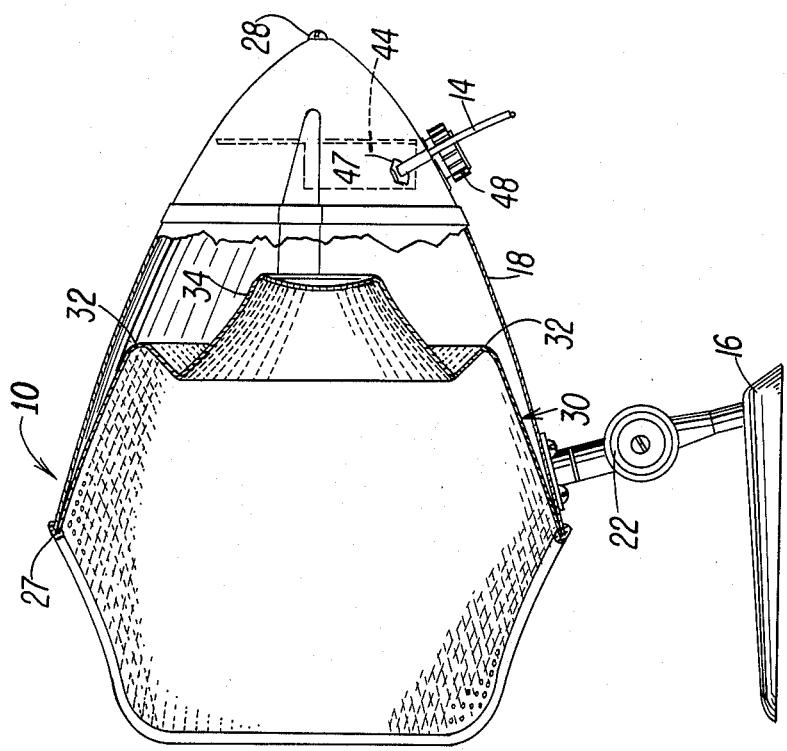
FIGURE 3 is a side, partial cross-sectional view of the acoustical isolation chamber shown in FIGURE 1.
Figure 2:
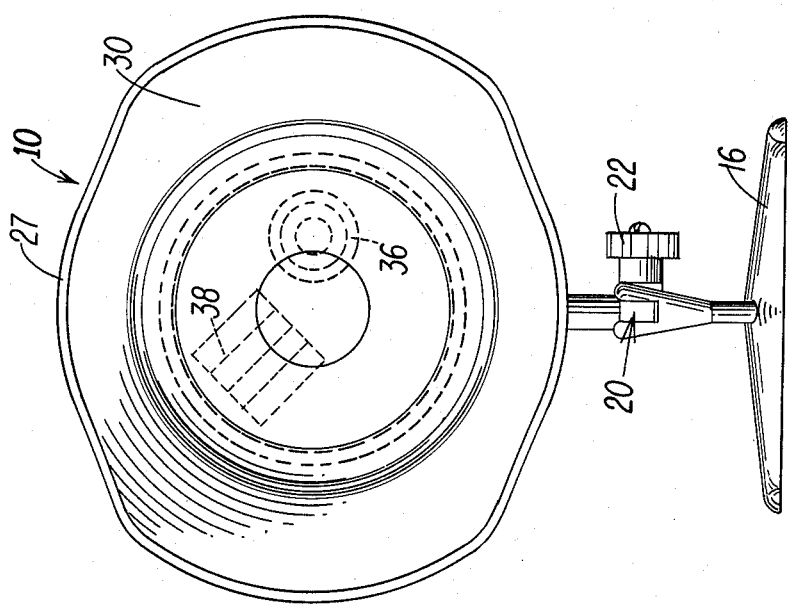
FIGURE 2 is a front view of the acoustical isolation chamber shown in FIGURE 1.

Referring now to the drawings, and more particularly to FIGURES 1–3, an acoustical isolation chamber of the present invention is indicated generally by reference numeral 10. A pair of earphones 12 is connected to the acoustical isolation chamber 10 by jack lead 14. The acoustical isolation chamber 10 is placed upon a desk at which the student sits during audio training. The student, with the earphones 12 on, listens to the tape recorder, for example, pronounce words or phrases of the foreign language he is learning to pronounce. After listening to the pronunciation of the word or phrase from the tape recording the student practices by pronouncing the same word or phrase into the acoustical isolation chamber 10. Through a microphone arrangement in the acoustical isolation chamber 10, which will be described in more detail hereinafter, the student will hear his own pronunciation through the earphones 12. In this manner the student will be able to determine if he is properly pronouncing the foreign word or phrase.

The acoustical isolation chamber 10 has a conically shaped exterior 18 and is mounted upon a base 16. The position of the isolation chamber 10 may be varied by reason of its pivotal attachment to the base 16, indicated generally by reference numeral 20. A rotatable knob 22 secures the isolation chamber 10 in the desired position after pivotal adjustment.

The isolation chamber 10 comprises two detachable sections, a microphone section 24 and an audio insulation chamber 26 that are held together by a bolt 28 which extends longitudinally through the microphone section 24 into the end of the audio insulation chamber 26.

The audio insulation chamber 26 has an open end, the upper portion 27 of which is concave to allow the student to rest his forehead thereon when he is talking into the insulation chamber 26. A pair of baffle wings 28 extend from the sides of the insulation chamber 26. When the student is talking into the acoustical isolation chamber 10, these baffle wings 28 will extend around the sides of the student's head. In this manner the baffle wings 28 provide acoustical and visual isolation for the student.

The interior of the audio insulation chamber 26 has an acoustical liner 30 made of perforated sound insulating material well known in the art. At the interior end of the acoustical liner 30 is a hollow truncated cone section 34, the longitudinal axis of which lies on the longitudinal axis of the audio insulation chamber 26. The walls of the truncated cone section 34 are slightly convex toward the interior of the audio insulation chamber 26. Surrounding the truncated cone section 34 is an annular groove 32. This configuration of the audio insulating chamber 26 and its lining 30 minimizes sounds of one student talking into the audio insulation chamber 26 from interfering or distracting other students working at their acoustical isolation chamber 10. Furthermore, the liner 30 directs the sound of the student's voice into a microphone 36 in the microphone section 24 by which it is transmitted back to the student through his earphones 12.

The microphone section 24 contains the microphone 36 mounted therein to face toward the audio insulation chamber 26 as seen in FIGURE 2. Also mounted within the microphone section 24 are batteries 38, a sensing inductor (not shown), a pre-amplifier (not shown), an acoustical equalizer (not shown), and the power amplifier 44. These components are connected in the manner shown in FIGURE 4. A jack outlet 47 is within the microphone section 24 and is connected to the power amplifier 44. A jack lead 14 for the earphones 12 is attached to the jack outlet 47. A volume control knob 48 extends from the microphone section 24 so that the student may properly adjust the volume of the tape recording.

The system of audio training embodying the present invention is diagrammatically illustrated in FIGURE 4. Basically the system is made up of a transmitter section 46 and a receiver section 48. The transmitter section 46 includes essentially a tape recorder 52 for supplying audio information, an electro-magnetic transmitter 54 for converting the audio information into electro-magnetic pulsations, and a transmitting inductor 56, such as a magnetic loop, for radiating magnetic waves. The receiver section 48 is made up essentially of a combined sensing inductor-acoustic microphone 58 responsive both to magnetic waves and to acoustic information, a pre-amplifier and acoustical equalizer section 60, a power amplifier section 62 and an acoustic reproducer 64 such as a loudspeaker or earphones. The receiver section 48 is carried essentially in the microphone section 24 of the isolation chamber 10.

In effect, the transmitting section 46 makes the classroom a restricted transmitting station and each acoustical isolation chamber 10 equipped with the receiver section 48. The tape recorder 52, the electro-magnetic transmitter 54 and the transmitting inductor 56 are standard components of any suitable type. In the receiver section 48 the sensing inductor-acoustical microphone 58 may be separate units connected in a matched impedance configuration or may, for example, be a magnetic microphone of the controlled magnetic reluctance type. The pre-amplifier 60, the power amplifier 62 and the acoustical reproducer 64 may be of any suitable type.

The transmitting inductor 56 may be a wire which runs around the base molding or the like of the classroom being employed for audio training purposes. This wire may be hidden in the base molding and thus the outward appearance of the classroom would not be altered. In effect the transmitting section 46 will, through the transmitting inductor 56, transmit within the classroom loop the particular material contained on the tape being played on the tape recorder.

The receiver section 48 and its components are installed in the microphone section 24 of the acoustical isolation chamber 10, as discussed hereinbefore. The sensing inductor 58 receives the signals being emitted by the transmitting inductor 56 of the transmitting section 46 and directs them through the pre-amplifier and acoustical equalizer 60 and the power amplifier 62 to the acoustic reproducer 64, which in this case is the set of earphones 12. In this manner the student hears through the earphones 12 the tape being played on the tape recorder 52, although the acoustical isolation chamber 10 is not electrically connected by wire to the tape recorder. When the student talks into the acoustical microphone 58 his sounds are passed through the same pre-amplifier and acoustical equalizer 60 and power amplifier 62 back to the acoustic reproducer 64, e.g., earphones 12.

It will, therefore, be understood that the system of audio training and the acoustical isolation chamber 10 of the present invention afford a versatile system in which the classroom is not permanently committed to audio training classes. As the acoustical isolation chamber 10 is not electrically connected to the tape recorder and may be set upon any desk or relatively flat surface, the classroom may be readily converted into a room suitable for standard teaching methods by merely removing the acoustical isolation chambers 10 from the desks and placing them in storage.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A sound isolation chamber having a generally conical external surface, said isolation chamber comprising an audio insulation chamber and a microphone section detachably connected thereto, said audio insulation chamber having an open end, a pair of baffle wings extending from sides of said insulation chamber, an acoustical liner of sound insulation material in said audio insulation chamber, said acoustical liner having a truncated cone section at its inner end, the axis of said truncated cone section lying on the longitudinal axis of the audio insulation chamber, said acoustical lining having a circular groove therein surrounding said truncated cone section, and a microphone mounted in said microphone section.

2. The sound isolation chamber of claim 1 including a base means whereby said sound isolation chamber may be set upon a desk or the like.

3. A sound isolation chamber having a generally conical external surface, said isolation chamber comprising an audio insulation chamber and a microphone section detachably connected thereto, said audio insulation chamber having an open end, an upper portion of said open end having a concave surface, a pair of baffle wings extending from sides of said audio insulation chamber, an acoustical liner of sound insulation material in said audio insulation chamber, said microphone section housing a microphone and means to sense audio signals from a transmitting inductor, said acoustical liner having a truncated cone section at its inner end, the axis of said truncated cone section lying on the longitudinal axis of the audio insulation chamber, and said acoustical lining having a circular groove therein surrounding said truncated cone section.

4. In a system for audio training wherein recordings are played to a student, the improvement comprising a transmitting inductor in a clasroom for transmitting wirelessly audio information from the recording, a sound isolation chamber at which the student is sitting, said sound isolation chamber including a sensing inductor to receive said audio information and means to convert said audio information from the sensing inductor to sounds audible to the student at the sound isolation chamber, said sound isolation chamber including a microphone through which audible sound from the student is received, said microphone being connected to said means for converting audio information whereby audible sounds received by said microphone are converted to audible sounds heard by said student, said sound isolation chamber having a generally conical exterior surface, said isolation chamber including an audio insulation chamber and a microphone section detachably connected thereto, said audio insulation chamber having an open end, a pair of baffle wings extending from the sides of said insulation chamber, an acoustical liner of sound insulation material in said audio insulation chamber, said acoustical liner having a truncated cone section at its inner end, the axis of said truncated cone section lying on the longitudinal axis of the audio insulation chamber, said acoustical liner having a circular groove therein surrounding said truncated cone section.

5. A system for audio training in a classroom comprising means for wirelessly transmitting audio information in said classroom, a portable sound isolation chamber adapted to provide a listening and speaking facility for a student, said chamber including audio amplification means for providing the listening facility to the student and said chamber including sensing means responsive to said audio information and responsive to audible spoken words of the student for providing audio signals to said audio amplification means whereby the student listens to said transmitted audio information and his spoken word, said sound isolation chamber having a generally conical exterior surface, said isolation chamber including an audio insulation chamber and a microphone section detachably connected thereto, said audio insulation chamber having an open end, a pair of baffle wings extending from the sides of said insulation chamber, an acoustical liner of sound insulation material in said audio insulation chamber, said acoustical liner having a truncated cone section at its inner end, the axis of said truncated cone section lying on the longitudinal axis of the audio insulation chamber, said acoustical liner having a circular groove therein surrounding said truncated cone section.

References Cited by the Examiner

UNITED STATES PATENTS

| | | | |
|---|---|---|---|
| D. 136,134 | 8/1943 | Manning | 20—3.5 X |
| 1,085,621 | 2/1914 | Lutenberger | 179—183 |
| 1,777,433 | 10/1930 | Hale | 179—82 |
| 2,736,928 | 3/1956 | Manning | 20—3.5 |
| 2,804,933 | 9/1957 | Imhof | 179—183 X |
| 2,899,547 | 8/1959 | Crow et al. | 179—82 |

FOREIGN PATENTS

| | | |
|---|---|---|
| 557,589 | 5/1958 | Canada. |
| 855,085 | 11/1960 | Great Britain. |

OTHER REFERENCES

U.S. Department Health, Education and Welfare Bulletin 1959, No. 3 (published 1958), pages 20–23, "Foreign Language Laboratories in Schools and Colleges."

Tape Recording Magazine, "Tape of Babel," vol. 7, No. 11, October 1960 (pages 23–37).

ROBERT H. ROSE, *Primary Examiner.*

WALTER L. LYNDE, *Examiner.*

HAROLD BOOHER, HARVEY ZELLER, *Assistant Examiners.*